United States Patent [19]

Kasuga et al.

[11] Patent Number: 5,541,898
[45] Date of Patent: Jul. 30, 1996

[54] DEVICE FOR DRIVING AN OBJECTIVE LENS

[75] Inventors: Ikuo Kasuga; Toru Kamada; Fumio Kobayashi; Yasuyuki Nakahara, Shimosuwa-machi, Japan

[73] Assignee: Sankyo Seiki Mfg. Co., Ltd., Shimosuwa-Machi, Japan

[21] Appl. No.: 538,836

[22] Filed: Oct. 4, 1995

Related U.S. Application Data

[63] Continuation of Ser. No. 364,523, Dec. 27, 1994, abandoned, which is a continuation of Ser. No. 215,503, Mar. 21, 1994, abandoned, which is a continuation of Ser. No. 931,769, Aug. 18, 1992, abandoned.

[30] Foreign Application Priority Data

Aug. 20, 1991 [JP] Japan ............................ 3-73335
Aug. 28, 1991 [JP] Japan ............................ 3-76285
Sep. 19, 1991 [JP] Japan ............................ 3-84275
Nov. 5, 1991 [JP] Japan ............................ 3-99106
Nov. 7, 1991 [JP] Japan ............................ 3-99439
Dec. 13, 1991 [JP] Japan ............................ 3-109731

[51] Int. Cl.$^6$ ........................................... G11B 7/00
[52] U.S. Cl. ........................... 369/44.14; 369/44.22
[58] Field of Search .......................... 369/44.14, 44.15, 369/44.16, 44.17, 44.21, 44.22; 359/814, 824; 336/200, 232

[56] References Cited

U.S. PATENT DOCUMENTS

| | | | |
|---|---|---|---|
| 3,436,687 | 4/1969 | Andrews, Jr. et al. | 336/200 |
| 4,313,151 | 1/1982 | Vranken | 336/232 |
| 4,759,005 | 7/1988 | Kasahara | 369/44.14 |
| 4,998,802 | 3/1991 | Kasuga et al. | 369/44.22 |

FOREIGN PATENT DOCUMENTS

| | | | |
|---|---|---|---|
| 59-152605 | 8/1984 | Japan | 336/200 |
| 61-150139 | 7/1986 | Japan | 369/44.14 |
| 62-183038 | 8/1987 | Japan | 369/44.14 |

Primary Examiner—Georgia Y. Epps
Assistant Examiner—P. W. Huber
Attorney, Agent, or Firm—McAulay Fisher Nissen Goldberg & Kiel, LLP

[57] ABSTRACT

An objective lens-driving used in the optical pickup of an optical disk drive. The device comprises an objective lens holder for holding an objective lens, a sheet coil, and a counterbalance mounted on the opposite side of the objective lens. The sheet coil comprises an insulating sheet on which focusing helical coil patterns and tracking helical coil patterns are juxtaposed. The holder has sheet-holding portions of an arc-shaped cross section. The focusing and tracking coil patterns are formed on the curved surfaces of the sheet-holding portions. Focusing magnets are mounted opposite to the focusing coil patterns. Tracking magnets are mounted opposite to the tracking coil patterns.

18 Claims, 11 Drawing Sheets

DEVICE FOR DRIVING AN OBJECTIVE LENS

CROSS REFERENCE TO RELATED APPLICATIONS

The present application is a continuation of application Ser. No. 08/364,523 filed Dec. 27, 1994, which is a continuation of application Ser. No. 08/215,503 filed Mar. 21, 1994, which is a continuation of application Ser. No. 07/931,769 filed Aug. 18, 1992, all of said prior applications having now been abandoned.

BACKGROUND OF THE INVENTION a) Field of the Invention

The present invention relates to an objective lens-driving device used in an optical pickup that is used in an optical disk drive or the like.

b) Background Art

An optical pickup in an optical disk drive or the like has an objective lens-driving device so that the light beam emitted from a laser or the like is kept focused on a desired recording track on the recording surface of an optical disk. The objective lens-driving device comprises a focus direction driver and a tracking direction driver. The focus direction driver consists of focusing driver coils for driving the objective lens in the direction of the optical axis and focusing magnets. The tracking direction driver consists of tracking driver coils for driving the objective lens perpendicularly to the optical axis and tracking driver magnets.

The present applicant has already filed a Japanese patent application (Japanese Patent Laid-Open No. 307029/1989) for a small-sized, efficient, economical, and highly reliable objective lens-driving device. This device is made up of a small number of components and comprises focusing magnets, tracking magnets, focusing driver coils, and tracking driver coils. The focusing magnets and tracking magnets are mounted on their respective common, continuous surfaces and separately magnetized in mutually perpendicular directions. These common surfaces are continuous arc-shaped surfaces common to the respective surfaces of the focusing driver coils and of the tracking driver coils which are opposite to the magnets, respectively. These arc-shaped surfaces extend about a stationary shaft. The focusing driver coils and the tracking driver coils are opposite to the focusing magnets and the tracking magnets, respectively, and are mounted on their respective common, continuous surfaces. These common surfaces are also common to the planes, respectively, of the focusing magnets and of the tracking magnets. A thrust produced between the focusing magnets and the focusing driver coils moves the objective lens in the direction of the optical axis. A thrust created between the tracking magnets and the tracking driver coils moves the objective lens in a direction perpendicular to the optical axis.

In this objective lens-driving device, the magnetization of the focusing magnets is separate from the magnetization of the tracking magnets. For these two kinds of magnetization, their dedicated magnetic circuits can be used. Since the magnets and focusing and tracking driver coils opposite to their respective magnets are disposed on their respective common surfaces, the magnetic gap at the locations at which the coils are disposed is small. Therefore, high-density magnetic flux is obtained. Hence, an efficient objective lens-driving device can be derived. Also because the focusing and tracking magnets, the magnetic circuits, and the coils can be designed so that they form dedicated portions, the performance can be improved by optimizing the design.

In this way, the objective lens-driving device described above yields advantages but there is room for improvement. In particular, the driver coils used only for focusing and the driver coils used only for tracking are used as separate components. Also, wound coils are employed. Therefore, it is cumbersome and costly to assemble the device. Because the individual coils are not uniformly wound and because they tend to become loose, it is impossible to narrow the gaps between the driver coils and their respective magnets. Consequently, the sensitivity is low.

The known objective lens-driving device described above is generally constructed as shown in FIGS. 1 and 3. This device has a cylindrical holder 20. Each coil 10 takes the form of a sheet and consists of plural sheet elements of an insulator laminated on top of each other and adhesively bonded together. This plural sheet arrangement in the prior art is generally similar to the plural sheet arrangement of the invention as shown in FIGS. 4 and 5. When this holder is shaped into a cylindrical form to permit the sheet coil to be mounted on the holder, the sheet elements tend to crack because a curvature difference exists between the inner side and the outer side. If the sheet elements crack, then the focusing helical coil patterns on the sheet elements and the tracking helical coil patterns on the sheet elements may break or short-circuit, or the focusing coil patterns and the tracking coil patterns may be exposed and short-circuited to other portions. Otherwise, the coil patterns may be eroded.

Each of the sheet elements described above is fabricated by forming focusing and tracking coil patterns on a large substrate of an insulating material by etching or plating technique and then blanking each sheet element out of the substrate. Because of error introduced in the blanking operation, the positional relations among the blanking contour, the focusing coil patterns, and the tracking coil patterns may deteriorate, thus inhibiting the usage. Especially, where plural sheet elements are laminated, if the positional relationship between the focusing coil patterns and the tracking coil patterns is incorrect, the efficiency of the coil drops. Also, holes which should permit the focusing and tracking coils to be electrically connected together are misaligned. This makes it impossible to electrically connect together the focusing and tracking coils.

In view of this situation, the following method of inspection may be contemplated. The focusing or tracking coil pattern close to the outer periphery of each individual sheet element is used as a reference, or a marking pattern is formed close to the outer periphery of each individual sheet element. The focusing or tracking coil forming the reference or the marking pattern is observed from outside the sheet element. Those sheet elements which cannot be observed are taken as substandard products. However, in order to precisely observe the focusing or tracking coils or the marking pattern from outside the sheet element, the coils or pattern must be magnified by a microscope or the like. Also, it is necessary to observe the coils or pattern from four directions outside the sheet element. Consequently, this inspection is quite cumbersome and inefficient to perform.

OBJECTS AND SUMMARY OF THE INVENTION

It is an object of the present invention to provide an objective lens-driving device which is free of the foregoing problems with the prior art techniques and which prevents holes permitting electrical interconnection of focusing and tracking coil patterns from being damaged when a sheet coil is mounted on an objective lens holder. The foregoing problems are solved by using the sheet coil as a coil for driving the objective lens. The sheet coil is formed by laminating plural sheet elements on which focusing and tracking coil patterns are formed.

It is another object of the invention to provide an objective lens-driving device which reduces the possibility of occurrence of cracks if sheet elements are shaped cylindrically and mounted to a cylindrical objective holder and which prevents cracks from extending to the bodies of the focusing coil patterns and of the tracking coil patterns if such cracks occur, thereby solving various problems such as breaking of coils, short-circuit, and corrosion due to the cracks. Each sheet element consists of helical focusing and tracking coil patterns sandwiched between insulating sheets.

It is a further object of the invention to provide an objective lens-driving device which prevents the body of the stretched sheet from cracking if the device is mounted to a cylindrical sheet-holding frame.

It is yet another object of the invention to provide an objective lens-driving device which is easy and economical to assemble, prevents non-uniform winding of the individual coils, prevents the coils from becoming slack, and can narrow the gaps between driver coils and their respective magnets to thereby enhance the sensitivity.

It is still another object of the invention to provide an objective lens-driving device which permits one to quite easily and precisely check the deviations of the positions of focusing and tracking coil patterns from the contours of sheet elements with the naked eye if such deviations occur and which permits one to readily check the deviations of the positions of the focusing and tracking coils by viewing them from sides if sheet elements are laminated.

In accordance with the invention, a device for driving an objective lens comprises an objective lens holder which has sheet-holding portions and to which the objective lens is mounted, a sheet coil comprising an insulating sheet on which focusing helical coil patterns and tracking helical coil patterns are juxtaposed, the sheet coil being mounted to the sheet-holding portions of the objective lens holder, focusing magnets disposed opposite to the focusing coil patterns, and tracking magnets disposed opposite to the tracking coil patterns.

For a better understanding of the present invention, reference is made to the following description and accompanying drawings while the scope of the invention will be pointed out in the appended claims.

DETAILED DESCRIPTION OF THE INVENTION

Figure 1:
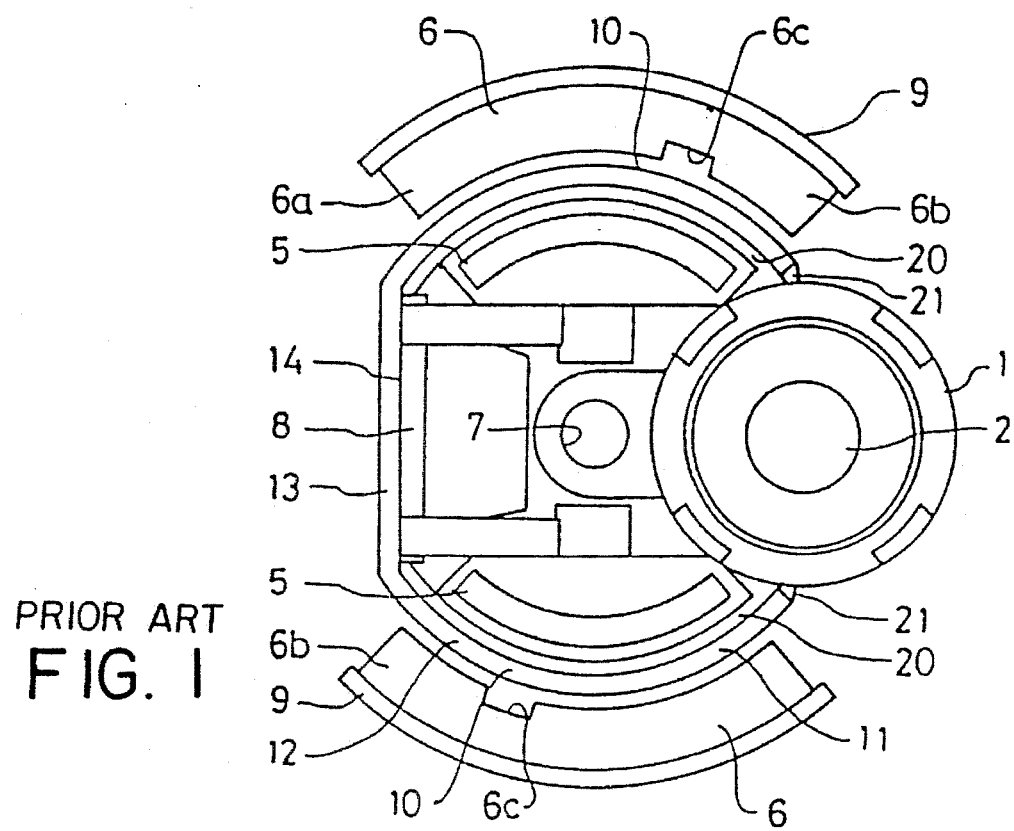
FIG. 1 is a plan view of an objective lens-driving device according to the Prior Art.
Figure 2:
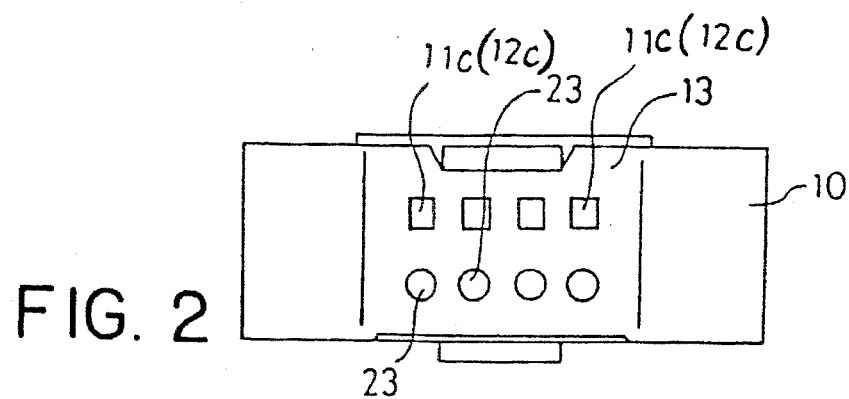
FIG. 2 is a side elevation of an objective lens-driving device similar to that shown in FIG. 1 but which is modified in accordance with the present invention.

Referring to FIGS. 1 and 2, an objective lens holder 1 is provided with a hole 7 extending axially. The holder 1 is mounted in such a way that a fixed shaft passes through the hole 7. Thus, the holder 1 is held so as to be rotatable about the fixed shaft and movable along the shaft. An objective lens 2 is mounted to the lens holder 1 in such a manner that the optical axis of the lens 2 is parallel to the axial hole 7. A counterbalance 8 is mounted to the lens holder 1 on the opposite side of the axial hole 7 from the objective lens 2.

The objective lens holder 1 is symmetrical with respect to the line connecting the center of the axial hole 7 with the center of the objective lens 2, and has sheet-holding frames 20. Each frame 20 is a part of a cylinder that is coaxial with the hole 7. The aforementioned counterbalance 8 is disposed on the opposite side of the hole 7 from the objective lens 2. In this embodiment, the counterbalance 8 is located between the sheet-holding frames 20. The rear surface of the counterbalance 8 forms a planar portion 14. A sheet coil 10 is adhesively bonded to the outer surfaces of the sheet-holding frames 20 and has sheet elements on which coil patterns 11 and 12 are circumferentially arranged. The coil patterns 11 act as focusing driver coils. The coil patterns 12 serve as tracking driver coils. The sheet coil 10 extends from one frame 20 to the other frame 20 across the planar portion 14 on the rear side of the counterbalance 8. Those portions of the coil 10 which are attached to the frames 20 are cylindrical along the curved surfaces of the frames 20. The longitudinally intermediate portion 13 of the coil 10 is flat along the planar portion 14. In FIG. 1, the sheet coil 10 is bonded to the sheet-holding frames 20 via adhesive 21. For the bonding, a pressure-sensitive adhesive sheet placed on the sheet coil may be used together with this adhesive.

Figure 3:
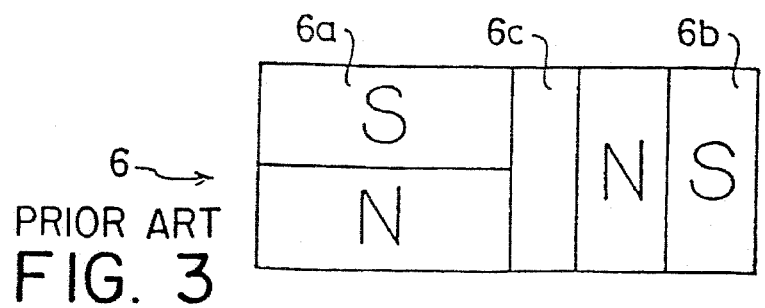
FIG. 3 is a front elevation of one magnet used in the device shown in FIG. 1.

Magnets 6 are mounted on the outer surfaces of the curved portions of the sheet coil 10 by yokes 9, respectively, the curved portions extending along the curved portions of the sheet-holding frames 20. The curved yokes 9 and the curved magnets 6 are coaxial with the curved portions of the sheet coil 10 about a point. The inner surfaces of the magnets 6 are spaced a given distance from the outer surfaces of the curved portions, respectively, of the sheet coil 10. Each magnet 6 is integrally molded out of magnetic powder bonded together via a resinous binder such as epoxy resin or polyamide resin. Referring also to FIG. 3, each magnet 6 is provided with a groove 6c extending parallel to the hole 7 described above to form a focusing magnet 6a and a tracking magnet 6b on opposite sides of the groove 6c. This groove 6c is located in an intermediate position of the curved portion of the magnet and prevents magnetic interference between the focusing magnet 6a and the tracking magnet 6b. The focusing magnet 6a is magnetized with its north and south poles arranged axially. On the other hand, the tracking magnet 6b is magnetized in a direction perpendicular to the magnetization direction of the focusing magnet 6a such that the north and south poles of the tracking magnet 6b are circumferentially arranged. In this way, the magnets 6a and 6b are disposed on their respective common continuous planes by being formed integrally.

Figure 5:
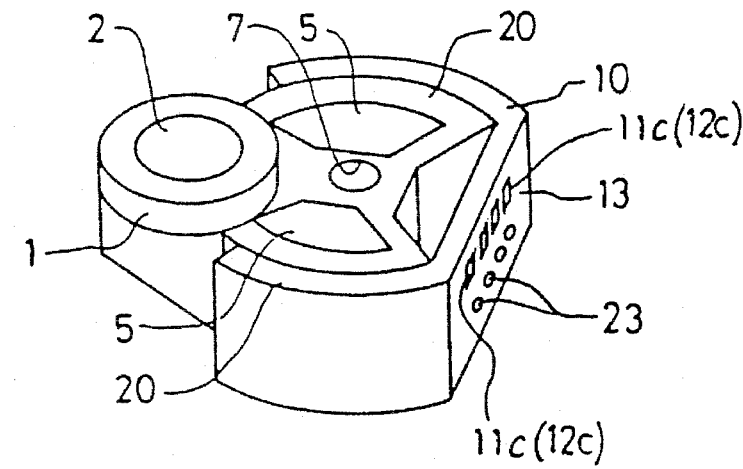
FIG. 5 is a perspective view of the sheet coil shown in FIG. 4 mounted to the sheet holding frame of the lens holder.

The focusing magnets 6a of the magnets 6 are opposite to the focusing coil patterns 11 of the sheet coil 10, while the tracking magnets 6b are opposite to the tracking coil patterns 12 of the sheet coil 10. Other yokes 5 are mounted to the inner surfaces of the sheet-holding frames 20, respectively. The yokes 5 are formed integrally with the frames 20, respectively. The outer surfaces of the yokes 5 are coaxial with the curved surfaces of the sheet-holding frames 20. In accordance with the present invention, as shown in FIGS. 2 and 5, the intermediate portion 13 of the sheet coil 10 which is located over the planar portion 14 is provided with holes 23 extending through the coil 10. These holes 23 permit the focusing and tracking coil patterns formed on the sheet elements of FIG. 6 to be electrically connected with each other.

Figure 4:
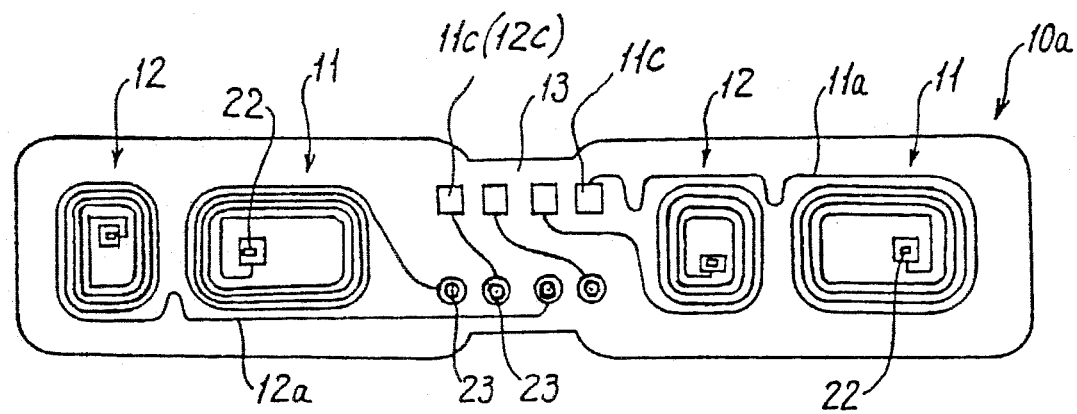
FIG. 4 is a front elevation of one specific example of a sheet constructed in accordance with the present invention and which can be coil constructed in accordance with the present invention and which can be used in the device shown in FIG. 1.

One example of the sheet coil 10 having the focusing coil patterns 11 and the tracking coil patterns 12 is now described by referring to FIG. 4. In this example of the sheet coil 10, only the uppermost sheet element 10a is shown. On this sheet element 10a, helical coil patterns 11 which are used for focusing purposes are located on opposite sides of the intermediate portion 13. Helical coil patterns 12 which are used for tracking purposes are located on opposite sides of the intermediate portion 13. These coil patterns are formed by etching, plating or other method. The focusing coil patterns 11 on the opposite sides are connected in series by a conductive interconnection pattern 12a. A desired number of sheet elements (such as 10a) of this construction are laminated and adhesively bonded together to form the single sheet coil 10. The terminals of certain focusing and tracking coil patterns are electrically connected With each other through the holes 23 by soldering, so that the focusing coil patterns 11 of the sheet elements are connected in series. Similarly, the tracking coil patterns 12 of the sheet elements are connected in series. Depending on the specifications or requirements, these coil patterns may be connected in parallel.

Figure 6:
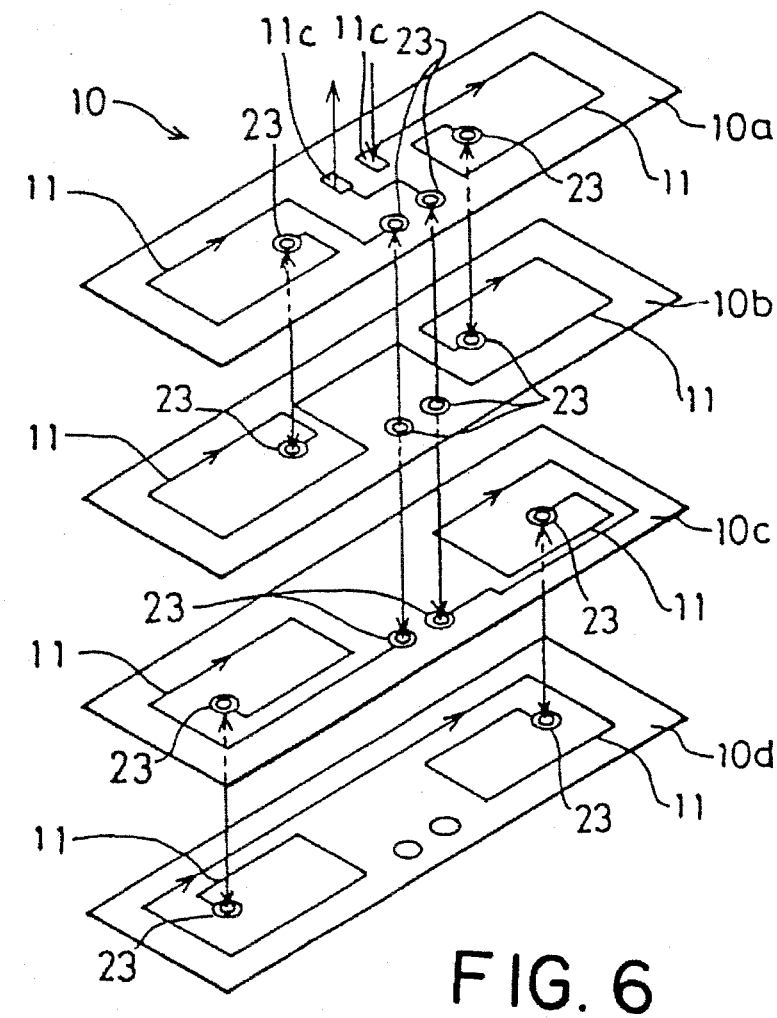
FIG. 6 is an exploded perspective view of a sheet coil which can be used in the present invention and which has holes extending therethrough.

One example of a method of forming the holes 23 permitting electrical connection between the focusing and tracking coil patterns is now described by referring to FIG. 6. In this example, the sheet coil consists of four sheet elements 10a, 10b, 10c, and 10d. It is to be noted that only the focusing coil patterns 11 are shown. Two focusing coil patterns 11 are formed on each of the sheet elements 10a–10d. The focusing coil patterns 11 are electrically connected in series with each other either through the holes 23 or via conductive interconnection patterns formed on the respective sheet elements. The holes 23 allow the focusing coil patterns 11 to be Connected in series. Some of the holes 23 are used to electrically connect two adjacent sheet elements. The remaining holes 23 are employed to electrically connect three adjacent sheet elements. The focusing coil patterns 11 are connected via terminals 11c with an external circuit (not shown) which energizes these coil patterns 11.

The sheet elements 10a, 10b, 10c and 10d have tracking coil patterns in the same way as in the example of FIG. 4. The sheet elements are provided with holes extending therethrough to permit the tracking coil patterns to be connected in series. In the same way as the focusing coil patterns 11, some of these holes are used to electrically connect two adjacent sheet elements, while the remaining holes are used to electrically connect three neighboring sheet elements. The tracking coil patterns 12 are connected with the external circuit (not shown) via terminals 12c.

Soldering paste is sealed in the holes 23 to dip the coil patterns in the solder for electrically connecting the focusing and tracking coil patterns formed on the sheet elements. In this example, the coil patterns are soldered in the holes extending through the four sheet elements. In this way, the sheet coil 10 and the sheet elements are laminated. Also, the focusing and tracking coil patterns on the sheet elements are electrically connected through the holes extending through the sheet elements. This sheet coil 10 can be fabricated by the following method. A copper layer is formed on an insulating substrate. The copper layer is selectively etched away to form copper patterns. Alternatively, a photoresist is applied to the surface of an insulating substrate, and then helical patterns are formed in the photoresist layer. The helical patterns are plated with copper to form copper patterns.

The sheet coil 10 fabricated as described above is rigidly held along the sheet-holding frames 20 of the objective lens holder 1 and along the intervening planar portion 14. The holes 23 which are used in electrically connecting three sheet elements as described in connection with FIG. 6 are located in the planar portion 14 of the lens holder 1 as shown in FIGS. 2 and 5.

Figure 7:
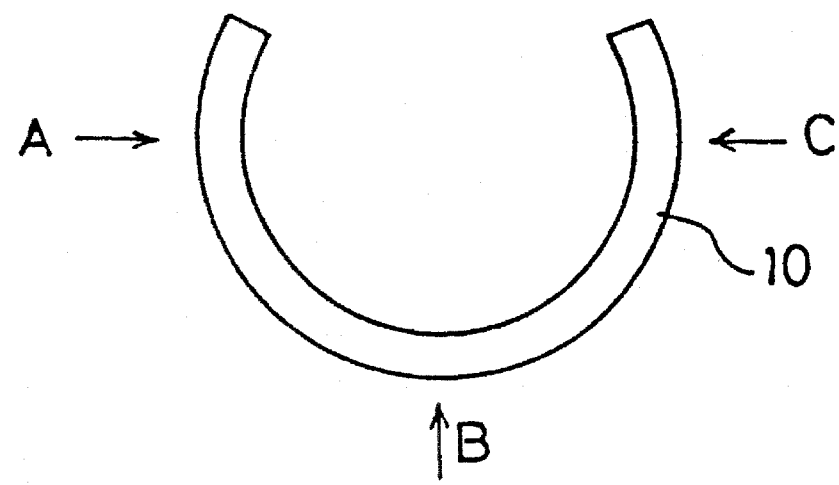
FIG. 7 is a plan view of a sheet coil, in which it is curved.
Figure 8:
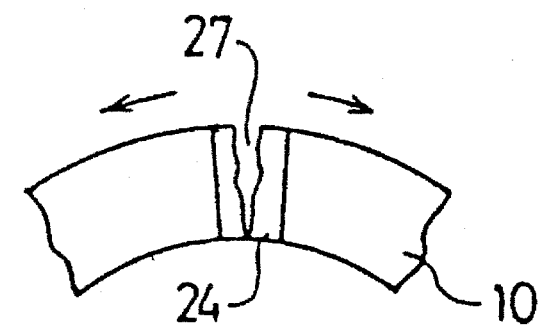
FIG. 8 is a fragmentary plan view of a curved sheet coil, illustrating the manner in which a crack is produced around a hole due to the curvature of the coil.
Figure 9:
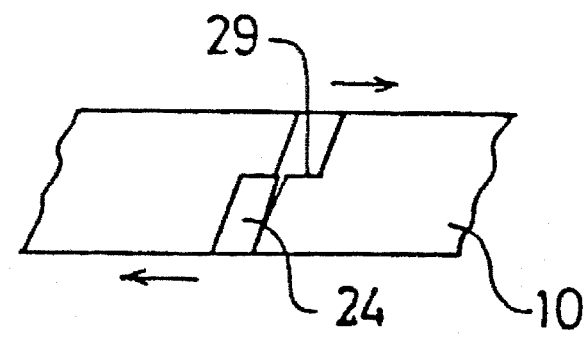
FIG. 9 is a fragmentary plan view of a sheet coil, illustrating the manner in which a hole is damaged by a shearing force produced in the coil.

When the sheet coil 10 is mounted along the sheet-holding frames 20 of the objective lens holder and along the planar portion 14, the coil 10 is curved along the cylindrical surfaces of the frames 20. As shown in FIG. 7, if the whole sheet coil 10 is curved into cylindrical form, stress is concentrated around the holes existing over the whole portion including the portions A and C close to both ends and a central portion B due to curvature. Therefore, as shown in FIG. 8, the solder 24 in the holes may form a crack 27. As shown in FIG. 9, a shearing force is produced in the portions A and C close to both ends because the inner side and the outer side slide relative to each other. The solder 24 in the holes may be cut along the shearing plane 29 by the shearing force. In such event the sheet coil breaks between the sheet elements.

The aforementioned problem caused by the curvature of the sheet coil 10 becomes serious where the holes 23 permit numerous sheet elements to be electrically connected. Where two sheet elements are electrically connected through the holes, almost no problem takes place. In the example of FIG. 6, the holes 23 allowing three sheet elements to be electrically connected are located in the centers of the sheet elements. When the sheet coil 10 is rigidly mounted to the objective lens holder 1, these holes 23 are located over the planar portion 14 of the holder 1 and, therefore, it is unlikely that the solder in these holes 23 is damaged by the concentration of stress of shearing force due to the curvature of the sheet coil 10. In FIG. 6, those holes 23 which enable two sheet elements to be electrically connected are positioned closer to both ends of the sheet elements and hence curved. However, the solder in these holes 23 is hardly damaged as described previously. If necessary, these holes 23 may be placed over the planar portion 14.

Figure 10:
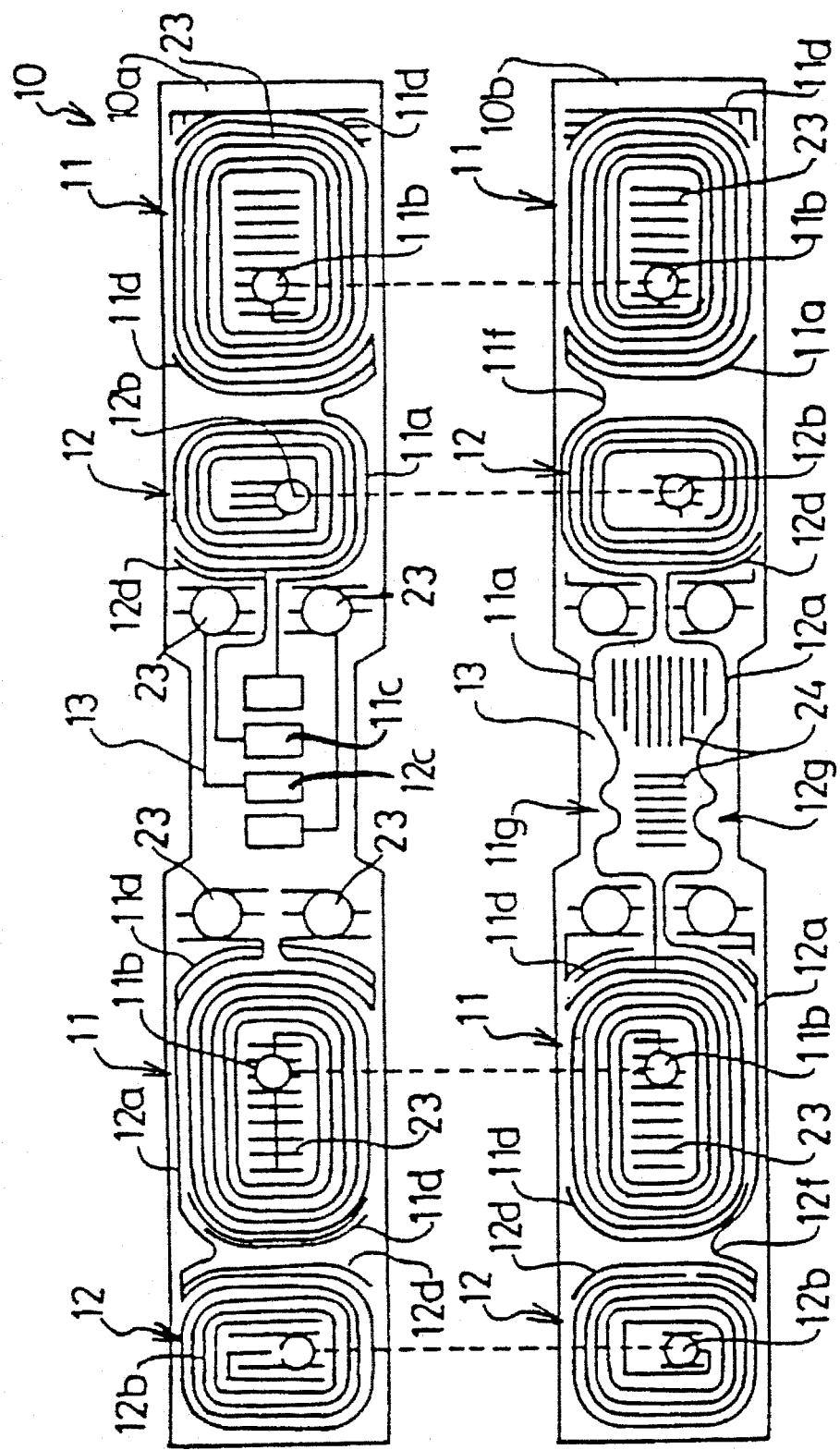
FIG. 10 is a plan view of sheet coils according to the invention, and in which dummy patterns are formed on the coils.

Referring next to FIG. 10, numerous dummy patterns 11d are formed along the outer periphery of each focusing coil pattern 11. Similarly, numerous dummy patterns 12d are formed along the outer periphery of each tracking coil pattern 12. In the figure, only a few dummy patterns are drawn. Since the dummy patterns 11d and 12d are formed by plating, they are electrically connected with conductive interconnection patterns 11a and 12a, respectively, in this embodiment. It is not always necessary that the dummy patterns 11d and 12d be electrically connected with the conductive interconnection patterns 11a and 12a.

Dummy patterns 23 in the form of stripes are formed inside the focusing helical coil patterns 11. Likewise, dummy patterns are formed inside the tracking helical coil patterns 12. Dummy patterns 24 consisting of vertical and horizontal stripes are formed between the conductive interconnection patterns 11a and 12a which cross the intermediate portion 13 of the sheet element 10b.

A pattern-free, gap portion is formed between each focusing coil pattern 11 located on each side of the intermediate portion 13 of each of the sheet elements 10a and 10b and the adjacent tracking coil pattern 12 to facilitate shaping the coil into a cylindrical form. The conductive interconnection pattern 11a which crosses one of these gap portions has a serpentine portion 11f intruding into the gap portion. Similarly, the conductive interconnection pattern 12a that passes across the other gap portion has a serpentine portion 12f entering the gap portion. The interconnection patterns 11a and 12a crossing the intermediate portion 13 of the sheet element 10b have serpentine portions 11g and 12g, respectively, each of which has plural turns. Since the sheet coil uses two pairs of sheet elements 10a and 10b, the holes 23 extending through these elements are formed to permit these elements to be electrically connected. Those portions which have neither the focusing coil patterns nor the tracking coil patterns are more easily bent than those portions which have the focusing or tracking coil patterns. When the sheet elements are curved as described above, the conductive interconnection patterns 11a and 12a formed straight tend to crack because of a difference in curvature between the inside and the outside. This will result in breaking of the coil patterns or short-circuit. To withstand the bending, the above-described serpentine portions 11f, 12f, 11g and 12g are formed.

Figure 11:
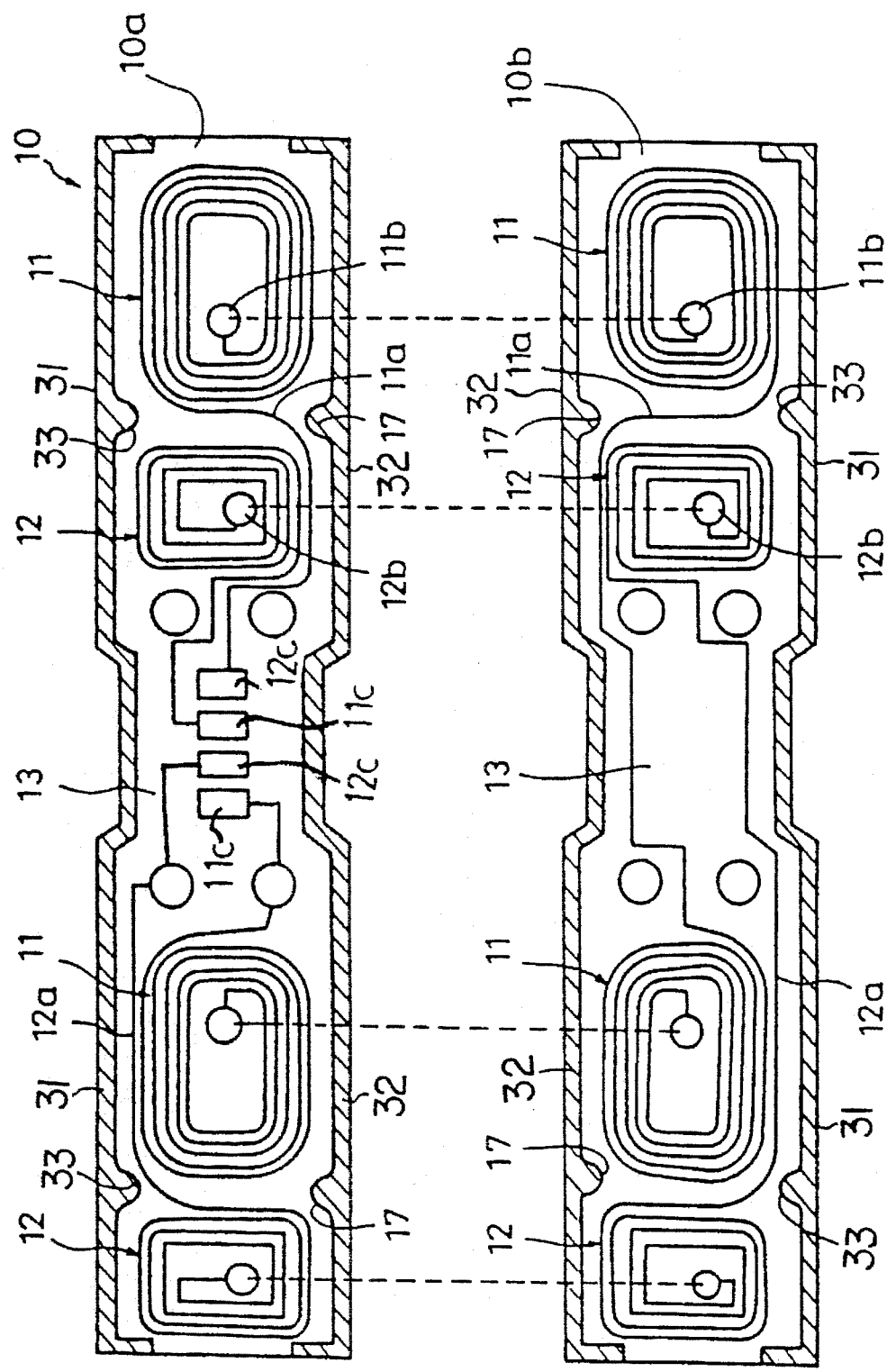
FIG. 11 is a plan view of sheet coils according to the invention, and in which reinforcing patterns are formed on the coils.

Referring to FIG. 11, continuous, conductive reinforcing patterns 31 and 32 wider than the focusing coil patterns 11 and the tracking coil patterns 12 on both sides are formed above and below the outer peripheries of these coil patterns 11, 12. Since no patterns are formed between the focusing coil patterns 11 and their respective tracking coil patterns 12, swelled portions 33 are formed to homogenize the resistance to the bending, similarly to the serpentine portions.

Figure 12:
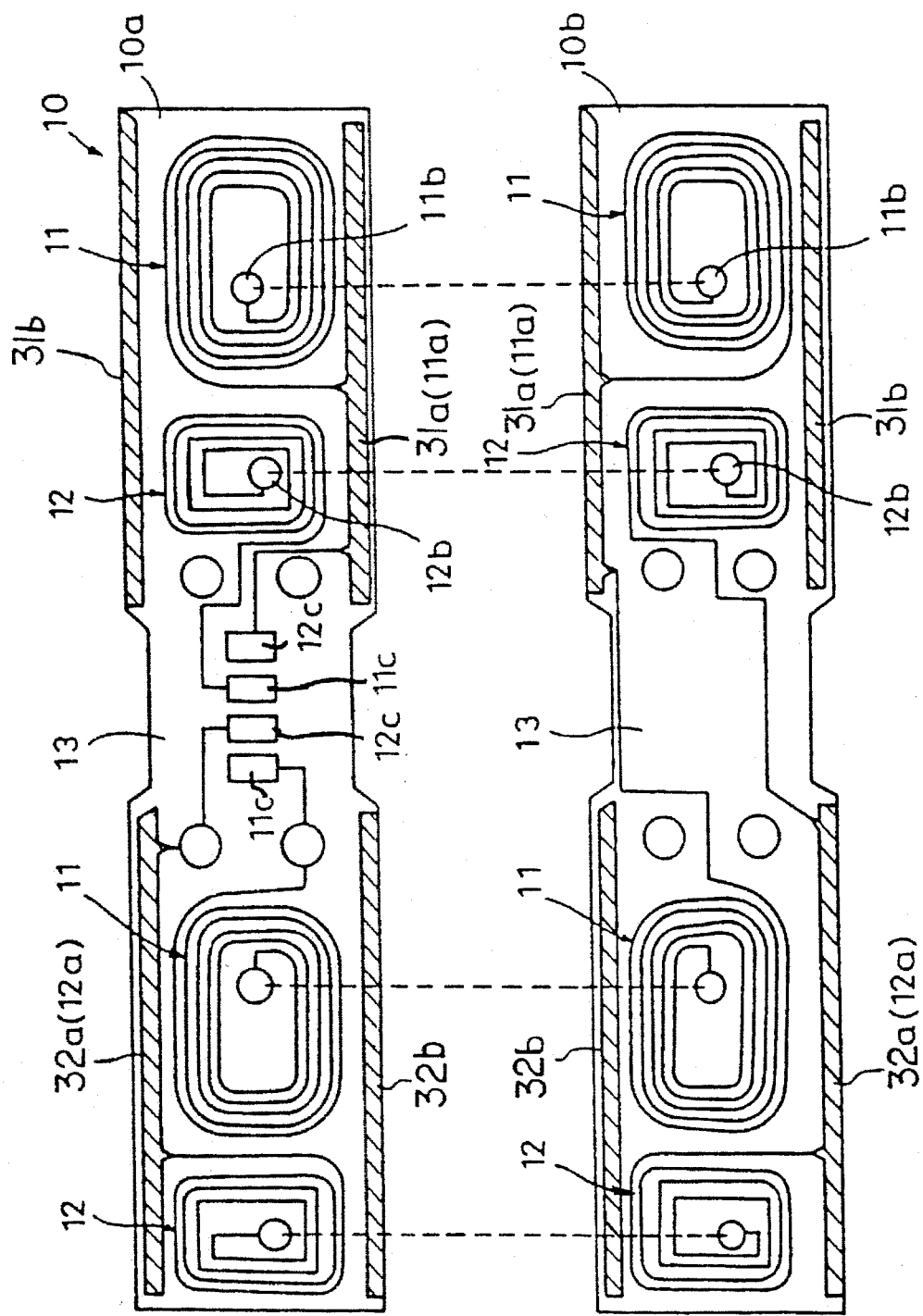
FIG. 12 is a plan view of other sheet coils according to the invention, and in which reinforcing patterns are formed on the coils.

Referring to FIG. 12 the focusing coil patterns 11 located on the opposite sides are connected in series by a reinforcing pattern 31a acting also as the conductive interconnection pattern 11a. Also, the tracking coil patterns 12 on the opposite sides are connected in series by a reinforcing pattern 32a serving also as the conductive interconnection pattern 12a.

Figure 15:
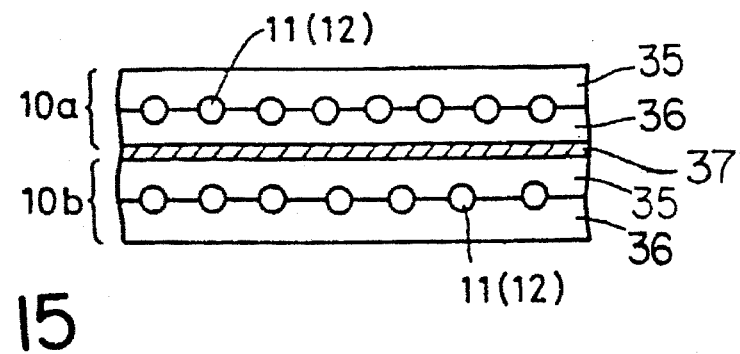
FIG. 15 is a cross-sectional view of a conventional sheet coil.
Figure 16:
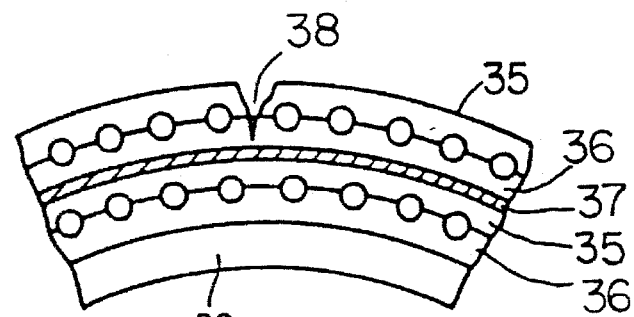
FIG. 16 is a cross-sectional view similar to FIG. 15, but in which the sheet coil is bent.

FIG. 15 shows the above-described sheet coil having the first sheet element 10a and the second sheet element 10b. The focusing conductive coil patterns 11 and the tracking conductive coil patterns 12 are formed on these sheet elements 10a, 10b. These coils are sandwiched between insulating sheets 35A,35B,36A and 36B and then the sheet elements 10a and 10b are bonded together by an adhesive layer 37. The sheet coil is mounted to the arc-shaped sheet-holding frames 20, as shown in FIG. 16. At this time, a tensile force is produced across the stretched insulating sheet 35, whereby a crack 38 may be produced. Therefore, the focusing coil patterns 11 or the tracking coil patterns 12 are exposed. As a result, breaking of the coil patterns or short-circuit to other components may be produced.

Figure 13:
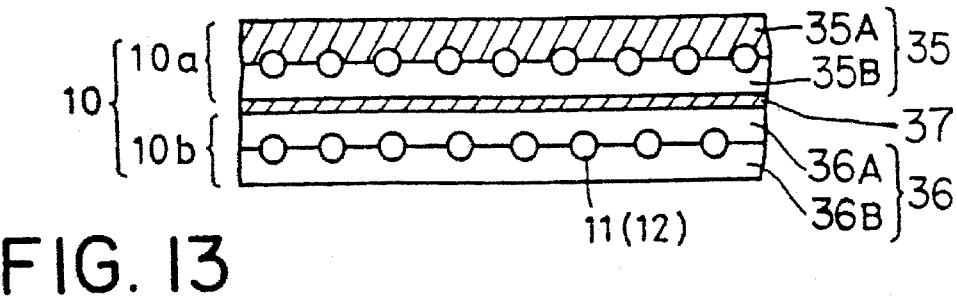
FIG. 13 is a cross-sectional view of a sheet coil according to the invention, the coil having insulating sheets made of a flexible material.
Figure 14:
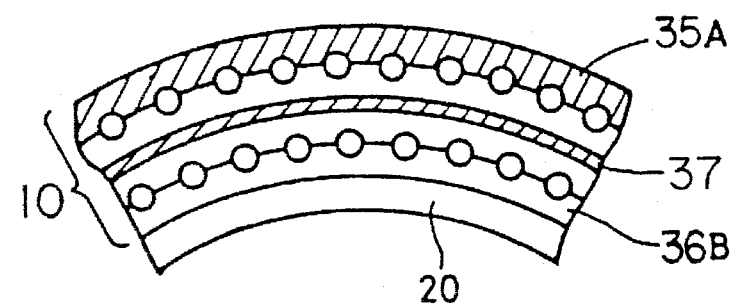
FIG. 14 is a cross-sectional view similar to FIG. 13, but in which the sheet coil is bent.

FIG. 13 shows the cross-sectional structure of the sheet coil 10. After mounting the sheet elements 10a and 10b between the insulating sheets 35 and 36, they are bonded together via the adhesive 37. Then, as shown in FIG. 14, the sheet coil 10 is mounted to the sheet-holding frames 20. In this case, the outer insulating sheet 35A of the first sheet element 10a which is stretched is made of a flexible material. The insulating sheet 35B forming an intermediate layer is made of a material having a sufficient rigidity to be used as a structural member of the coil. The insulating sheets 36A and 36B between which the second sheet element 10b is sandwiched are made of the same material as the insulating sheet 35B.

Figure 17:
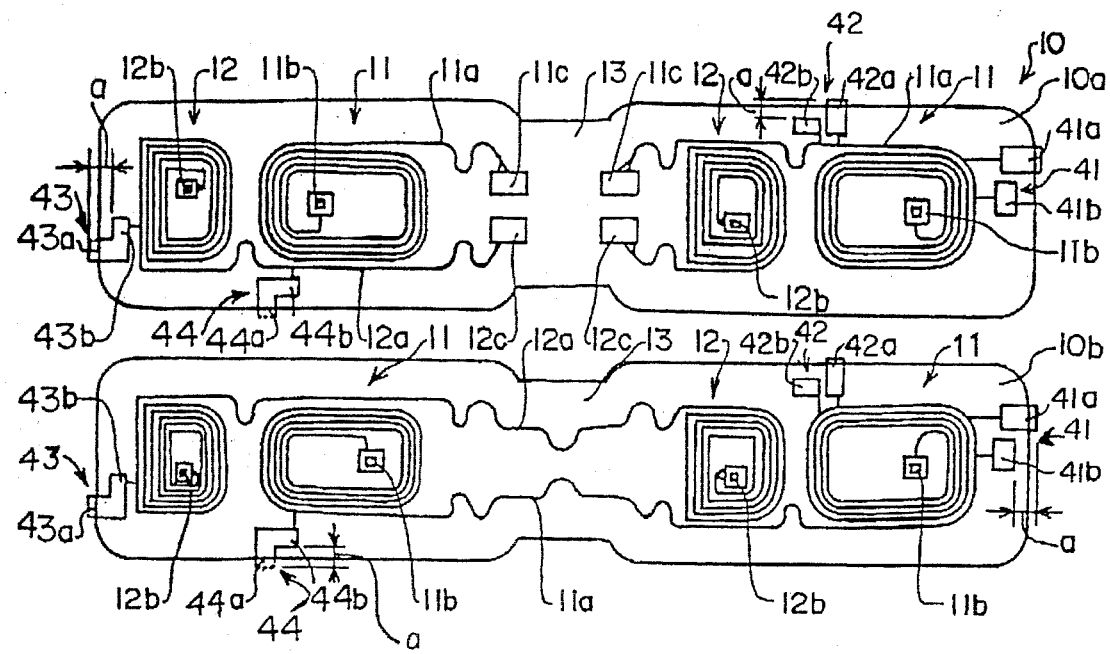
FIG. 17 is a plan view of sheet coils according to the invention, the coils having marks for position detection.

Referring to FIG. 17, a mark 41 is formed at one side end of each of the sheet elements 10a, 10b outside the outer focusing coil pattern 11 to permit detection of the positions of the focusing and tracking coil patterns relative to the sheet elements 10a and 10b. Each position detection mark 41 consists of a first mark portion 41a crossing one side end of the sheet element 10a or 10b and a second mark portion 41b extending perpendicularly to the first mark portion. The second mark portion 41b is located inside said one side end of the sheet element and closer to the focusing outer coil pattern 11. These two mark portions 41a and 41b are spaced apart from each other. The two mark portions 41a and 41b are formed simultaneously with the focusing coil patterns 11 and connected with the focusing coil patterns 11. A step $a$ is formed between the outer ends of the two mark portions 41a and 41b. The step $a$ is formed so as to match the tolerance for shifts of the coil patterns 11 and 12 longitudinally of the sheet elements 10a and 10b, respectively, relative to these sheet elements 10a and 10b. The marks 41 used for the position detection are also located between the sheet elements 10a and 10b, in the same way as the focusing and tracking coil patterns.

Also, a mark 42 is formed at one longitudinal end of each of the sheet elements 10a, 10b outside the outer focusing coil pattern 11 to permit detection of the positions of the focusing and tracking coil patterns relative to the sheet elements 10a and 10b. The marks 42 are similar in structure to the position detection marks 41. In particular, each mark 42 consists of two mark portions 42a and 42b extending in mutually perpendicular directions. These two mark portions 42a and 42b are formed together with the focusing outer coil pattern 11 and connected with this pattern 11. A step a is formed between the outer ends of the two mark portions 42a and 42b. The step a is formed so as to match the tolerance for shifts of the coil patterns 11 and 12 laterally of the sheet elements 10a and 10b, respectively, relative to these sheet elements 10a and 10b.

Each of the marks 41, 42 for the position detection consists of two separate mark portions. Other position detection marks 43 and 44 are shown in FIG. 17. Each mark consists of two mark portions which are joined into an L-shaped form. More specifically, each mark 43 for position detection comprises a first mark portion 43a extending vertically across one side end of each of the sheet elements 10a and 10b and a second mark portion 43b extending at right angles to the first mark portion 43a. These first and second mark portions are joined together. The first mark portion 43a is located at one side end of each of the sheet elements 10a and 10b. A step a is formed between the outer ends of the two mark portions 43a and 43b which is parallel to the side ends of the sheet elements 10a and 10b. The step a is formed so as to match the tolerance for the shifts of the focusing and tracking coil patterns 11 and 12 longitudinally of the sheet elements 10a and 10b, respectively.

Similarly, mark 44 comprises a first mark portion 44a extending laterally across the end of the sheet elements 10a and 10b and a second mark portion 44b extending at right angles to the first mark portion 44a. Portions 44a and 44b are joined together. A step a is formed between the outer ends of the two mark portions 44a and 44b. The step a is formed so as to match the tolerance for the shifts of the focusing and tracking coil patterns 11 and 12 laterally of the sheet elements 10a and 10b, respectively.

In the embodiment described thus far, if only the first mark portions 41a of the position detection marks 41 and the first mark portions 43a of the position detection marks 43 cross the side ends of the sheet elements 10a and 10b, it follows that the shifts of the focusing coil patterns 11 and of the tracking coil patterns 12 longitudinally of the sheet elements 10a and 10b lie within the tolerances. This sheet coil is judged to be acceptable. On the other hand, if the first mark portions 41a or the first mark portions 43a do not reach the side ends of the sheet elements 10a and 10b, and if the first mark portions 41a and the first mark portions 41b cross the side ends of the sheet elements 10a and 10b or the first mark portions 43a and the second mark portions 43b cross the side ends of sheet elements 10a and 10b beyond the tolerances, the sheet coil comprising these sheet elements 10a and 10b is regarded as substandard.

Similarly, if only the first mark portions 42a and 44a of the position detection marks 42 and 44, respectively, cross the end of the sheet elements 10a and 10b, then the sheet coil can be judged to be acceptable. On the other hand, if the first mark portions 42a or 44a do not reach the ends of the sheet elements 10a and 10b, then the sheet coil having the laminated sheet elements 10a and 10b can be judged to be substandard. Also, if the first mark portions 44a and the second mark portions 44b cross the ends of the sheet elements 10a and 10b, then the sheet coil can be judged to be substandard.

In this way, in the above embodiment, the shifts of the positions of the focusing and tracking coil patterns formed on the sheet elements consisting of an insulating material can be judged according to how the position detection marks are seen. Therefore, the shifts of the positions of the focusing and tracking coil patterns can be easily and precisely judged by observation with the naked eye. The end surfaces of the sheet elements are observed to know whether some or all of the position detection marks protrude from the end surfaces of the sheet elements or all of the position detection marks are retreated from the end surfaces of the sheet elements. Therefore, if sheet elements are laminated, it is possible to ascertain whether the focusing and tracking coil patterns have deviated.

In the above embodiment, the position detection marks are formed at four sides of each sheet element; it suffices to form the position detection marks on at least two sides of each sheet element. In this case, deviations of the focusing and tracking coil patterns longitudinally and laterally of the sheet element can be detected.

Figure 23:
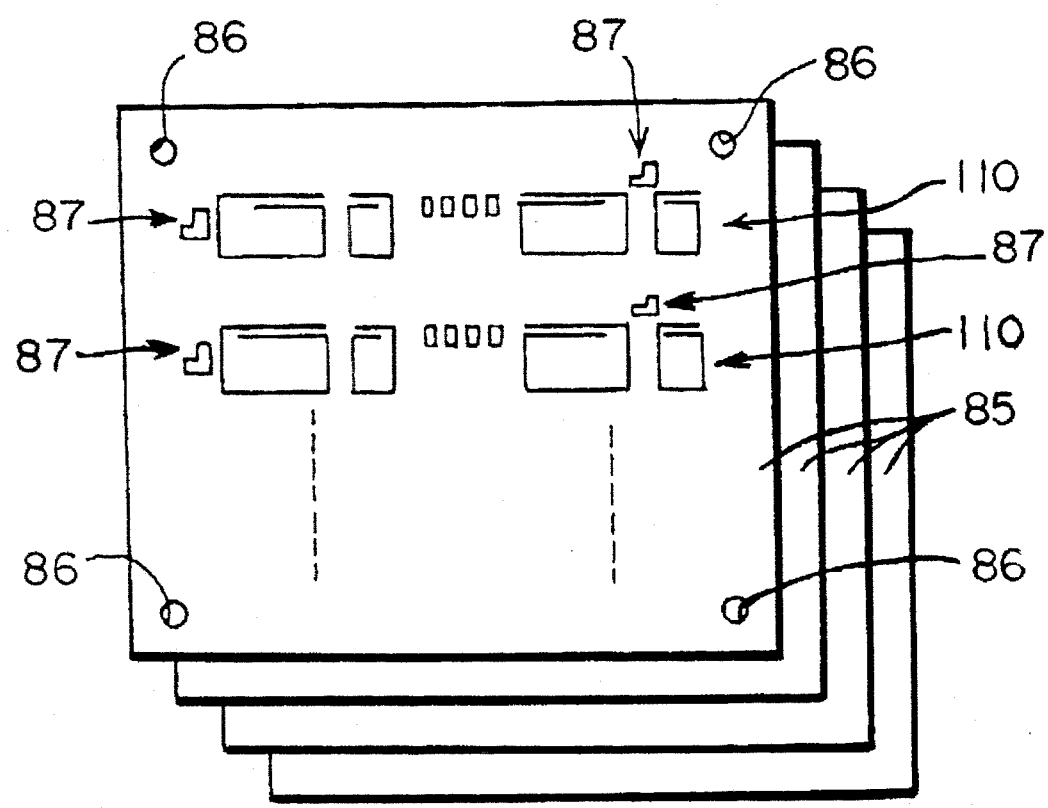
FIG. 23 is a perspective view of a sheet coil according to the invention, showing the manner in which the coil is being manufactured.

More preferably, parts of the position detection marks appear in the cross sections obtained by cutting the individual sheet elements out of the lamination having the numerous sheet elements, in order to know whether the focusing and tracking coil patterns formed on the sheet elements have deviated even if the plural sheet elements are stacked on top of each other. FIG. 23 shows examples of the substrates on which a multiplicity of sheet elements are formed. Guide holes 46 are formed at the four corners of each substrate 45. A number of coil patterns 110 forming the numerous sheet elements are formed, based on the guide holes 46. Two marks 47 for position detection are formed in a given relation to each pair of coil patterns 110. For the substrates 45, individual sheet elements are cut. Parts of the position detection marks 47 appear in the cross sections of the sheet elements.

Figure 18:
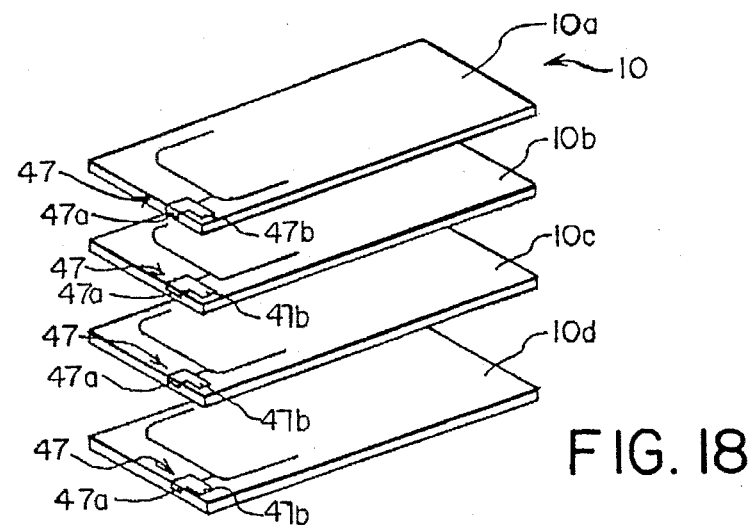
FIG. 18 is an exploded perspective view of a further sheet coil.
Figure 19:
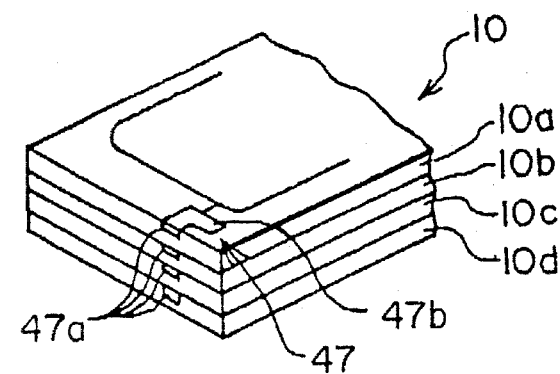
FIG. 19 is a fragmentary perspective view of the sheet coil shown in FIG. 18.

FIG. 18 and 19 show an example of lamination of individual sheet elements which are cut in this way. These sheet elements are indicated by 10a, 10b, 10c, and 10d, respectively. Marks 47 used for detection of positions are formed at ends of these sheet elements 10a–10d. Each mark 47 consists of a first mark portion 47a and a second mark portion 47b that is continuous with the first mark portion and extends perpendicular to it. The first mark portions 47a appear in the cross sections of the sheet elements 10a–10d.

In this embodiment of FIGS. 18 and 19, if only the first mark portions 47a appear in the cross sections of the sheet elements 10a–10d, then the sheet coil is judged to be acceptable. On the other hand, if none of the marks 47 appear, or if even the second mark portions 47b are seen, then the sheet coil is judged to be substandard. Therefore, if plural sheet elements are laminated, positional deviations of the focusing and tracking coil patterns can be easily and precisely detected.

Figure 20:
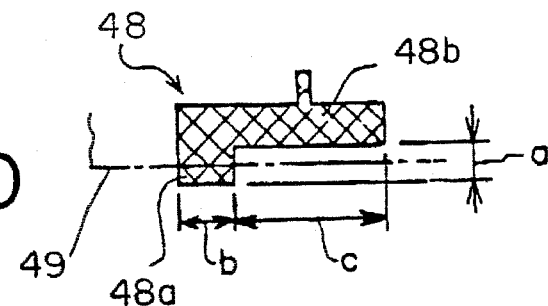
FIG. 20 is a plan view of another mark for position detection according to the invention.

In the embodiments described above, the length of the first mark portions and the length of the second mark portions have a 1:1 relation. This relation between the lengths can be set to any desired value. Referring to FIG. 20, a mark 48 used for position detection consists of a first continuous mark portion 48a and a second continuous mark portion 48b which extend in mutually perpendicular directions. The first mark portion 48a intersects the cross section 49 of the sheet element. Let b be the length of the first mark portion 48a taken parallel to the cross section 49. Let c be at least twice as large as the length b. A step a is formed between the ends of the first and second mark portions parallel to the cross section 49, in the same way as in the previous embodiments. This embodiment yields the same advantages as the previous embodiments.

Figure 21:
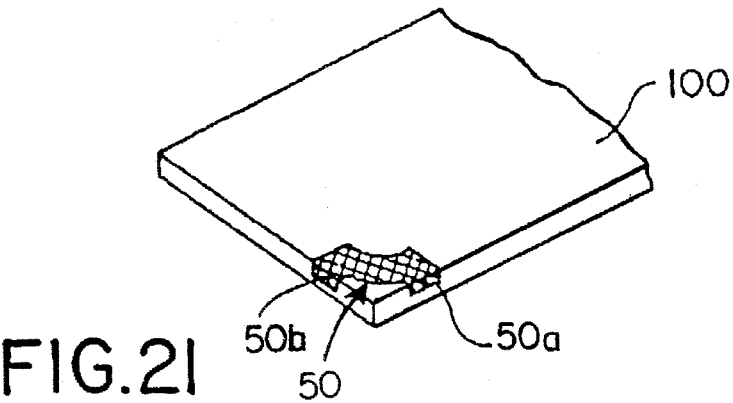
FIG. 21 is a fragmentary perspective view of a still further sheet coil according to the invention.
Figure 22:
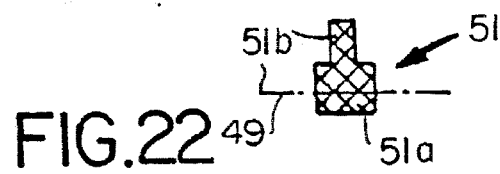
FIG. 22 is a plan view of a still other position detection mark according to the invention.

FIG. 21 and 22 show position detection marks having still other shapes. In the embodiment of FIG. 21, a mark 50 used for position detection is formed at one corner of a substrate 100. The mark 50 consists of a first mark portion 50a and a second mark portion 50b. The first mark portion 50a appears at one side cross section of the substrate 100. The second mark portion 50b appears at a cross section perpendicular to the above-described cross section. The two mark portions 50a and 50b are connected by an arc-shaped base portion. In this embodiment, the mark 50 is concentrated at the corner of the substrate 100. Therefore, it is possible to detect deviations of the positions of the focusing and tracking coil patterns longitudinally and laterally of the substrate.

In the embodiment of FIG. 22, a mark 51 used for position detection is formed. This mark 51 consists of a first wide mark portion 51a and a second narrow mark portion 51b which are continuous on a straight line. The first mark portion 51a crosses the cross section 49 of the sheet element. In this case, if the mark 51 is seen to be large in the cross section 49, i.e., if the first mark portion 51a is seen, the sheet coil is judged to be acceptable. If the mark 51 is seen to be small, i.e., if the second mark portion 51b is seen or the mark 51 is not seen at all, then the sheet coil is judged to be substandard.

The device of FIG. 1 modified to incorporate the present invention, uses a sheet coil comprising laminated sheet elements as described above. When a driving current is passed through the focusing coil patterns 11 via the pattern coils 11c, this driving current and the magnetic flux inside the magnetic circuit including the focusing magnet 6a produce a thrust. This thrust is produced equally in the two focusing coil patterns 11 disposed symmetrically with respect to the axial hole 7. This axial hole 7 in the objective lens holder 1 is moved along the fixed shaft. Thus, the objective lens 2 is moved along the optical axis, thus performing a focusing operation. When a driving current is passed through the tracking coil patterns 12 via the pattern terminals 12c, this driving current and the magnetic flux inside the magnetic circuit including the tracking magnet 6b create a thrust. This thrust is produced equally in the two tracking coil patterns 12 disposed symmetrically with respect to the axial hole 7. The objective lens 2 is moved together with the objective lens holder 1 in a direction perpendicular to the optical axis. As a result, a tracking operation is performed.

Preferably, all the holes permitting electrical connection of sheet elements are located in the planar portion 14 of the objection lens holder as described above. If this is impossible, a maximum possible number of the holes are located in the planar portion 14 of the objective lens holder as in the above embodiments.

FIG. 12 shows a still further embodiment of the invention. In this embodiment, reinforcing patterns act also as conductive interconnection patterns. In particular, conductive reinforcing patterns 32a and 32b wider than the focusing and tracking boil patterns are formed above and below the outer peripheries of one focusing coil pattern 11 and of one tracking coil pattern 12. Similarly, conductive reinforcing patterns 31a and 31b wider than the focusing coil pattern 11 and the tracking coil pattern 12 are formed above and below the outer peripheries of the other focusing coil pattern 11 and of the other tracking pattern 12.

The focusing coil patterns 11 on the opposite sides are connected in series by the reinforcing pattern 31a acting also as the conductive interconnection pattern 11a. Likewise, the tracking coil patterns 12 on the opposite sides are connected in series by the reinforcing pattern 32a acting also as the conductive interconnection pattern 12a.

In the embodiment of FIG. 12, the reinforcing patterns 31a, 31b, 32a, 32b are made of a conductive material. Of these patterns, the reinforcing patterns 31a and 32a act also as the conductive interconnection patterns 11a and 12a, respectively. However, the material of these reinforcing patterns 31a, 31b, 32a, 32b is not limited to conductive materials. Similar concept applies to the reinforcing patterns 31 and 32 of the embodiment of FIG. 11. In the embodiments of FIGS. 11 and 12, the reinforcing patterns 31, 32 or 31a, 31b, 32a, 32b can be formed over the whole periphery. However, when the occurrence of eddy current is taken into consideration, it is desired to form the reinforcing patterns only along a part of the periphery as in the present embodiment. Also, plural reinforcing patterns may be identical in width to the focusing coil patterns 11 and the tracking coil patterns 12. Furthermore, only one reinforcing pattern as wide as the focusing coil patterns 11 and the tracking coil patterns 12 may be formed. Additionally, one pattern having varying width may be formed.

The above-described eddy current is now described. When the magnetic flux in a conductor such as copper or iron varies, an electromotive force is induced. Then, a circulating current flows through the conductor so as to impede variations in the magnetic flux in the conductor. This current produces an ohmic loss inside the conductor. This elevates temperature and produces other adverse effects. Therefore, this eddy current is prevented.

In the above embodiments, a sheet coil is applied to an objective lens-driving device. The present invention is not restricted to this application. The invention can similarly be applied to an application in which a sheet coil is mounted to a cylindrical frame. Also, the invention is not limited to the case in which the stretched insulating sheet 35A is made of a flexible material. Alternatively, the insulating sheet 36B on the compressed inner surface may be made of a flexible material. Moreover, both insulating sheets 35A and 36B may be made of a flexible material.

The usage of the novel sheet coil is not limited to an optical pickup. Rather, the coil can be applied to voice coil motors and other driving coils finding various applications.

In accordance with the present invention, sheet elements comprising insulating sheets on which focusing and tracking coil patterns are juxtaposed are mounted to an objective lens holder. Therefore, it is not necessary to mold the focusing and tracking coil patterns one by one. Consequently, the sheet coil is easy and economical to assemble. Also, the accuracy of the positions of the focusing coil patterns relative to the positions of the tracking coil patterns is high. Furthermore, the coil is prevented from becoming slack or peeling off, unlike the prior art coils. Therefore, the reliability is high. In addition, it is easy to control the thickness of the sheet coil and so the gaps in the magnetic circuits where the focusing and tracking coil patterns are respectively located can be narrowed. In consequence, the driving sensitivity can be enhanced. Also, the sensitivity is prevented from varying from coil to coil.

The plural sheet elements forming the sheet coil are provided With holes extending through the sheet elements. The holes permit the focusing and tracking coil patterns to be electrically connected with each other. These holes are placed in the planar portion of the objective lens holder. Therefore, it is unlikely that the holes are damaged by concentration of stress of shearing force when the sheet coil is bent. As a result, the sheet coil is prevented from breaking between the adjacent sheet elements.

When the sheet coil is bent along the cylindrical objective lens holder, a difference is created in curvature between the inside and the outside of each laminated sheet element. Especially, a tensile force is produced in the outer sheet element, in which case the sheet element tends to crack. In accordance with the present invention, dummy patterns are arranged along the outer peripheries of the focusing and tracking coil patterns. In this structure, the sheet elements do not easily crack. That is, the dummy patterns minimize damage to the coil patterns that might occur because of the bending of the sheet coil around the cylindrically shaped sheet holding portions of the lens holder. If they should crack, the produced cracks will be prevented from going to the effective line portions of the focusing and tracking coil patterns. Therefore, the focusing and tracking coil patterns are prevented from breaking, short-circuiting, or corroding. Because of these effects of the invention the sheet coil can be shaped into a cylinder without difficulty.

Also, in accordance with the present invention, the focusing and tracking coil patterns have reinforcing patterns above and below the outer peripheries of the focusing and tracking coil patterns to prevent the sheet elements from easily cracking. If cracks should be produced, they will be prevented from elongating by the reinforcing patterns; the cracks will not reach the effective line portions of the focusing and tracking coil patterns. For these reasons, the focusing and tracking coil patterns are prevented from breaking, short-circuiting, or corroding. Because of these effects of the invention, the sheet coil can be shaped into a cylinder without difficulty.

Furthermore, in accordance with the present invention, the stretched or compressed insulating sheet which is an easily deformable member is made of a flexible material to mold the sheet coil. Therefore, if the sheet coil is mounted to cylindrical sheet-holding frames, or if a tensile force is produced in the stretched insulating sheet, no cracks are produced.

In accordance with the present invention, marks used for position detection are molded integrally with the focusing and tracking coil patterns. Therefore, the relation of the positions of the position detection marks to the positions of the focusing and tracking coil patterns is fixed. Seeing the relation of the position detection marks to the contour of the sheet coil is equivalent to seeing the relation to the focusing and tracking coil patterns to the contour of the sheet coil. Consequently, deviations of the focusing and tracking coil patterns Can be easily and precisely judged simply by seeing the relation of the positions of the position detection marks to the contour of the sheet coil.

Where parts of the position detection marks are designed to appear in the cross section of the sheet coil, when the plural sheet elements are laminated, deviations of the focusing and tracking coil patterns can be easily and precisely judged simply by seeing how the position detection marks appear in the cross section of the sheet elements.

While the foregoing description and drawings represent the preferred embodiments of the present invention, it will be obvious to those skilled in the art that various changes and modifications may be made therein without departing from the true spirit and scope of the present invention.

What is claimed is:

1. A device for driving an objective lens comprising:

an objective lens holder which includes cylindrically shaped sheet holding portions, a sheet coil mounted to said sheet holding portions of said objective lens holder, said sheet coil having an intermediate portion and first and second side portions on opposite sides of said intermediate portion, first and second focusing helical coil patterns on said first and second side portions respectively of said sheet coil, and first and second tracking helical coil patterns on said first and second side portions respectively of said sheet coil, said first tracking and first focusing patterns on said first side portion of said sheet coil being spaced from one another by a first gap, said second tracking and second focusing patterns on said second side of said sheet coil being spaced from one another by a second gap, said first and second focusing helical coil patterns being electrically connected to each other by a first conductive interconnection pattern that extends across said intermediate portion of said sheet coil, said first and second tracking helical coil patterns being electrically connected to each other by a second conductive interconnection pattern extending across said intermediate portion of said sheet coil, said first and second conductive interconnection patterns having sinuous shaped segments at said gaps and at said intermediate portion of said sheet coil.

2. The device for driving an objective lens of claim 1 further comprising:

dummy patterns on said sheet coil, said dummy patterns being formed along the outer peripheries of said focusing and tracking helical coil patterns.

3. The device for driving an objective lens of claim 2 wherein:

said sheet coil is formed of a plurality of laminated sheet elements, said coil patterns being deployed on each of said plurality of sheet elements, each of said sheet elements has holes therethrough to electrically connect said coil patterns on said sheet elements, dummy patterns on said sheet elements intersecting said holes.

4. The device of claim 2 further comprising:

a plurality of dummy patterns inside of said helical coil patterns and a plurality of dummy patterns between said conductive interconnection patterns at said intermediate portion of said sheet coil.

5. The device of claim 3 further comprising:

a plurality of dummy patterns inside of said helical coil patterns and a plurality of dummy patterns between said conductive interconnection patterns at said intermediate portion of said sheet coil.

6. The device for driving an objective lens of claim 1 wherein:

said sheet coil is formed of a plurality of laminated sheet elements, said coil patterns being deployed on each of said plurality of sheet elements, said holder includes planar sheet holding portion, said intermediate portion of said sheet coil is mounted on said planar portion of said lens holder, each of said sheet elements has holes therethrough to electrically connect said coil patterns on said sheet elements, at least some of said holes being located at said intermediate portion of said sheet coil.

7. The device for driving an objective lens of claim 1 wherein:

said sheet coil is formed of a plurality of laminated sheet elements, said coil patterns being deployed on each of said plurality of sheet elements, each of said elements has holes therethrough to electrically connect said coil patterns on said sheet elements, each of said sheet elements comprising first and second insulating sheets, said coil patterns on each sheet element being sandwiched between said first and second insulating sheets, said sheet coil having an outermost sheet element, the outermost insulating sheet of said outermost sheet element being made of a flexible material less rigid than the rest of said insulating sheets of said sheet elements.

8. The device for driving an objective lens of claim 3 further comprising:

a plurality of visible positioning mark patterns at the edges of each of said sheet elements, said sheet elements having longitudinal and lateral edges, at least one of said mark patterns being located on one of said longitudinal edges and at least one of said mark patterns being located on one of said lateral edges, whereby the visibility of a mark pattern on a longitudinal edge will indicate proper longitudinal positioning of said coil patterns on said sheet element and whereby the visibility of a marked pattern on a lateral edge will indicate lateral positioning of a coil pattern on said sheet element.

9. The device of claim 8 wherein:

each of said marks consists of first and second portions, said first portion extending to an edge of said sheet element, said second portion spaced from said edge of said sheet element, whereby either (a) the lack of a mark extending to an edge of said sheet element or (b) the visibility of said second portion of a mark at an edge of said sheet element, will indicate the improper positioning of said coil patterns on said sheet element.

10. A device for driving an objective lens comprising:

an objective lens holder which has cylindrically shaped sheet holding portions, a sheet coil mounted to said sheet holding portions of said objective lens holder, said sheet coil comprised of a plurality of laminated sheet elements, each of said sheet elements having an intermediate portion and first and second side portions on opposite sides of said intermediate portion to provide said sheet coil with an intermediate portion and first and second side portions, first and second focusing helical coil patterns on said first and second side portions respectively of each of said sheet elements, first and second tracking helical coil patterns on said first and second side portions respectively of each of said sheet elements, a plurality of holes through said sheet elements through which said coil patterns are electrically interconnected, said first tracking and first focusing patterns being spaced from one another by a first gap, said second tracking and second focusing patterns being spaced from one another by a second gap, said first and second focusing helical coil patterns being electrically connected to each other by a first conductive interconnection pattern that extends across said intermediate portion of said sheet coil, said first and second tracking helical coil patterns being electrically connected to each other by a second conductive interconnection pattern extending across said intermediate portion of said sheet coil, and dummy patterns on said sheet coil, said dummy patterns being formed along the outer peripheries of said focusing and tracking helical coil patterns.

11. The device for driving an objective lens of claim 10 further comprising:

dummy patterns on said sheet elements intersecting said holes.

12. The device of claim 10 further comprising:

a plurality of dummy patterns inside of said helical coil patterns and a plurality of dummy patterns between said conductive interconnection patterns at said intermediate portion of said sheet coil.

13. The device of claim 11 further comprising:

a plurality of dummy patterns inside of said helical coil patterns and a plurality of dummy patterns between said conductive interconnection patterns at said intermediate portion of said sheet coil.

14. The device for driving an objective lens of claim 10 wherein:

said coil sheet coil is formed of a plurality of laminated sheet elements, said coil patterns being deployed on each of said plurality of sheet elements, said holder includes a planar sheet holding portion, said intermediate portion of said sheet coil is mounted on said planar portion of said lens holder, each of said sheet elements has holes therethrough to electrically connect said coil patterns on said sheet elements, at least some of said holes being located at said intermediate portion of said sheet coil.

15. The device for driving an objective lens of claim 10 wherein:

said sheet coil is formed of a plurality of laminated sheet elements, said coil patterns being deployed on each of said plurality of sheet elements, each of said elements has holes therethrough to electrically connect said coil patterns on said sheet elements, each of said sheet elements comprising first and second insulating sheets, said coil patterns on each sheet element being sandwiched between said first and second insulating sheets, said sheet coil having an outermost sheet element, the outermost insulating sheet of said outermost sheet element being made of a flexible material less rigid than the rest of said insulating sheets of said sheet elements.

16. The device for driving an objective lens of claim 14 wherein:

said sheet coil is formed of a plurality of laminated sheet elements, said coil patterns being deployed on each of said plurality of sheet elements, each of said elements has holes therethrough to electrically connect said coil patterns on said sheet elements, each of said sheet elements comprising first and second insulating sheets, said coil patterns on each sheet element being sandwiched between said first and second insulating sheets, said sheet coil having an outermost sheet element, the outermost insulating sheet of said outermost sheet element being made of a flexible material less rigid than the rest of said insulating sheets of said sheet elements.

17. A device for driving an objective lens comprising:

an objective lens holder which has cylindrically shaped sheet holding portions, and a planar sheet holding center portion, a sheet coil mounted to said sheet holding portions of said objective lens holder, said sheet coil comprised of a plurality of laminated sheet elements, each of said sheet elements having an intermediate portion and first and second side portions on opposite sides of said intermediate portion to provide said sheet coil with an intermediate portion and first and second side portions, said intermediate portions of said sheet elements mounted on said planar portion of said lens holder, first and second focusing helical coil patterns on said first and second side portions respectively of each of said sheet elements, first and second tracking helical coil patterns on said first and second side portions respectively of each of said sheet elements, a plurality of holes through said sheet elements through which said coil patterns are electrically interconnected, at least some of said holes being located on said intermediate portion of said sheet elements, said first tracking and first focusing patterns being spaced from one another by a first gap, said second tracking and second focusing patterns being spaced from one another by a second gap, said first and second focusing helical coil patterns being electrically connected to each other by a first conductive interconnection pattern that extends across said intermediate portion of said sheet coil, said first and second tracking helical coil patterns being electrically connected to each other by a second conductive interconnection pattern extending across said intermediate portion of said sheet coil, and dummy patterns on said sheet coil, said dummy patterns being formed along the outer peripheries of said focusing and tracking helical coil patterns.

18. The device for driving an objective lens of claim 17 wherein:

said sheet coil is formed of a plurality of laminated sheet elements, said coil patterns being deployed on each of said plurality of sheet elements, each of said elements has holes therethrough to electrically connect said coil patterns on said sheet elements, each of said sheet elements comprising first and second insulating sheets, said coil patterns on each sheet element being sandwiched between said first and second insulating sheets, said sheet coil having an outermost sheet element, the outermost insulating sheet of said outermost sheet element being made of a flexible material less rigid than the rest of said insulating sheets of said sheet elements.

* * * * *